United States Patent [19]

Sepke

[11] Patent Number: 5,170,561
[45] Date of Patent: Dec. 15, 1992

[54] HUB ATTACHMENT FOR A DRIVE SHAFT OF A CORDLESS GRASS/WEED GROOMER TRIMMER

[75] Inventor: Arnold L. Sepke, Hudson, Ill.

[73] Assignee: National Union Electric Corporation, Cleveland, Ohio

[21] Appl. No.: 665,917

[22] Filed: Mar. 4, 1991

Related U.S. Application Data

[63] Continuation of Ser. No. 484,443, Feb. 21, 1990, abandoned, which is a continuation of Ser. No. 337,876, Apr. 14, 1989, abandoned.

[51] Int. Cl.$^5$ ............................................. B26B 7/00
[52] U.S. Cl. ........................................ 30/276; 56/12.7
[58] Field of Search .................. 30/276, 347; 56/12.7, 56/294, 295

[56] References Cited

U.S. PATENT DOCUMENTS

| D. 274,815 | 7/1984 | Ehrler et al. | D15/17 |
|---|---|---|---|
| 2,663,137 | 12/1953 | Asbury | 56/295 |
| 3,014,333 | 12/1961 | Clark, Jr. | 56/295 |
| 3,444,674 | 5/1969 | Huff et al. | 56/25.4 |
| 3,474,608 | 10/1969 | Frick | 55/18 |
| 3,664,102 | 5/1972 | Reber | 56/295 |
| 3,708,967 | 1/1973 | Geist et al. | 55/18 |
| 3,826,068 | 7/1974 | Ballas et al. | 56/12.7 |
| 3,831,278 | 8/1974 | Voglesenger . | |
| 4,054,992 | 10/1977 | Ballas et al. . | |
| 4,065,913 | 1/1978 | Fisher et al. | 56/295 |
| 4,089,114 | 5/1978 | Doolittle et al. | 30/276 |
| 4,112,653 | 9/1978 | Ballas et al. | 55/18 |
| 4,200,978 | 5/1980 | Irelan et al. | 30/276 |
| 4,259,782 | 4/1981 | Proulx | 30/276 |
| 4,295,324 | 10/1981 | Frantello et al. | 30/276 X |
| 4,586,257 | 5/1986 | Rittenhouse | 30/276 |
| 4,641,431 | 2/1987 | Leming et al. | 30/276 |

FOREIGN PATENT DOCUMENTS 1281450 12/1960 France .

Primary Examiner—Timothy V. Eley
Assistant Examiner—Willmon Fridie, Jr.
Attorney, Agent, or Firm—Hubbard, Thurman, Tucker & Harris

[57] ABSTRACT

A hub attachment for a rotating drive shaft of a handheld, portable string cutter for grass and weeds having a centrally located cylindrical anchor lug for a nylon cutting line which is held in a retainer line anchor that is in turn positioned in the semi-cylindrical cavity of the hub attachment. The retainer line anchor is provided with a latching tab that can be rotated from an unlatched position to a position in which the tab is removably attached to the hub.

25 Claims, 6 Drawing Sheets

FIG.11
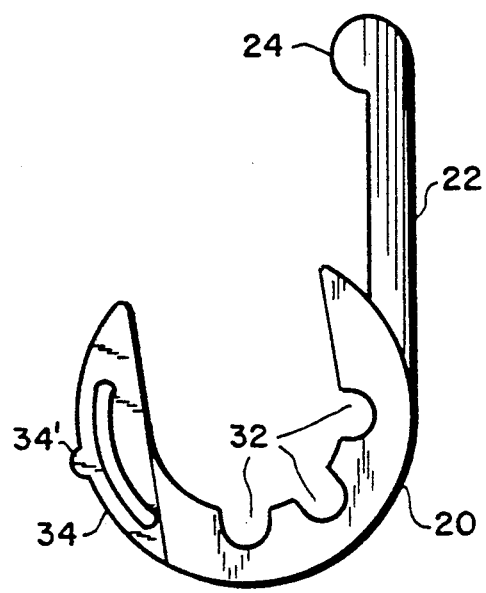
FIG.12
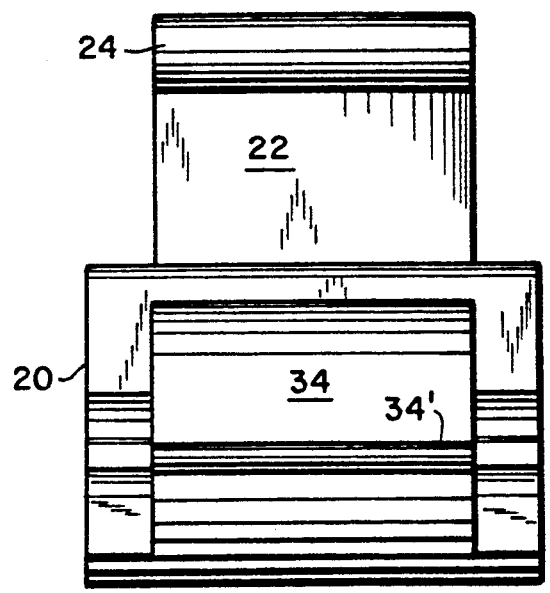
FIG.13
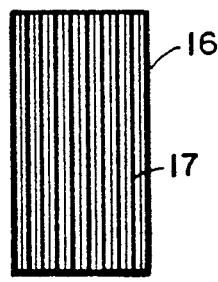
FIG.14
FIG.15
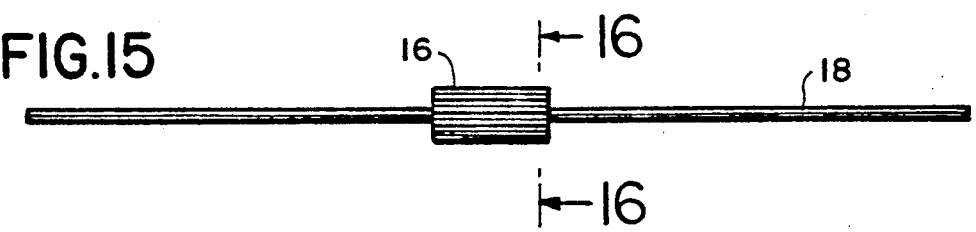
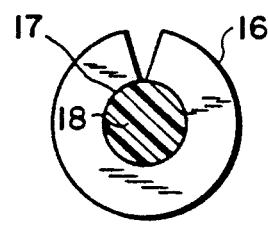
FIG.16

HUB ATTACHMENT FOR A DRIVE SHAFT OF A CORDLESS GRASS/WEED GROOMER TRIMMER

CROSS REFERENCE TO RELATED APPLICATIONS

This application is a continuation of application Ser. No. 484,443 filed Feb. 21, 1990 now abandoned, which in turn was a continuation of application Ser. No. 337,876 filed Apr. 14, 1989 now abandoned which in turn was a continuation in part of application Ser. No. 264,389, filed Oct. 31, 1988, now U.S. Pat. No. 4,987,681, issued Jan. 29, 1991 for which benefit under 35 U.S.C. §120 is claimed.

The present invention relates to a hub attachment for a drive shaft of a cordless grass/weed trimmer of the type shown in my copending patent application Ser. No. 264,389 filed Oct. 31, 1988 and entitled Hand Held Cordless Grass/Weed Trimmer.

BACKGROUND OF THE INVENTION

Previous constructions of the so-called nylon string grass and weed trimmer were not dynamically balanced for optimum performance while at the same time securely retaining the cutting line in the cutting chamber. The present invention overcomes that drawback by securely retaining the cutting line and centering it in the cutting chamber for optimum dynamic balance and performance.

It is another object of the present invention to provide a hub and cutting line arrangement which is so constructed and arranged in order to minimize the weight of mass of the rotating assembly, thus reducing the motor load especially during start-up of the groomer-trimmer in order to permit the hub assembly to achieve full rotational speed quickly.

It is a further object of the present invention to provide a detachable hub arrangement for the drive shaft of a grass/weed trimmer in which rapid replacement of cutting lines can be made without the use of tools.

It is a further object of the present invention to provide a line retaining mechanism for a detachable hub in which a spring-loaded mechanical interlock is provided which prevents the unintentional unlatching of the cutting line from the hub attachment.

It is an object of the present invention to provide a nylon cutting line having a centrally located cylindrical anchor lug which is inserted into a cylindrical cavity of a hub, and is provided with latching member for securely holding the centrally located lug in the cavity. The nylon cutting line projects from either end of the cylindrical anchor lug, the cutting line being securely held by being crimped on the anchor lug positioned in the hub cavity. Consequently, the nylon cutting lines can be easily and rapidly replaced by releasing the latching means and placing another anchor lug with projecting lines in the cylindrical cavity of the hub.

In order that the present invention will be more clearly understood, it will now be disclosed in greater detail with reference to the accompanying drawings in which:

FIG. 11 is an alternate construction of the retainer line anchor.

FIG. 12 is a front elevational view of the structure shown in FIG. 11.

FIG. 13 is the cylindrical anchor lug of FIG. 1 shown in a flat extended position.

FIG. 14 is a side elevational view thereof.

FIG. 15 is a view showing the anchor lug being centrally applied to a nylon cutting line and, FIG. 16 is an enlarged view of the lug taken along the line 16—16 of FIG. 15.

DESCRIPTION OF THE PREFERRED EMBODIMENT

Figure 1:
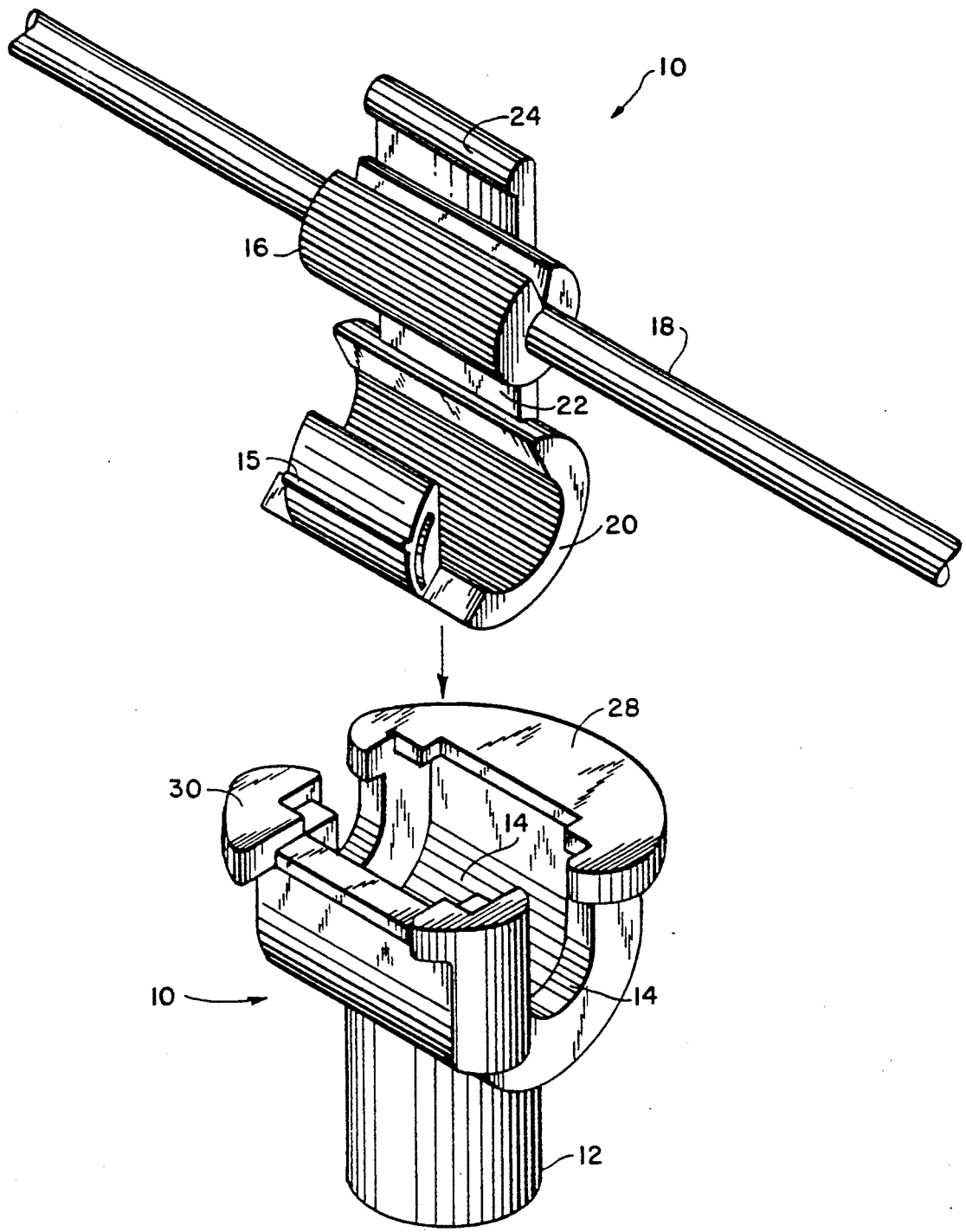
FIG. 1 is an exploded perspective view showing the anchor lug/cutting line assembly positioned within the cylindrical cavity, of the line anchor retainer, and said anchor lug being centrally crimped around said cutting line.
Figure 7:
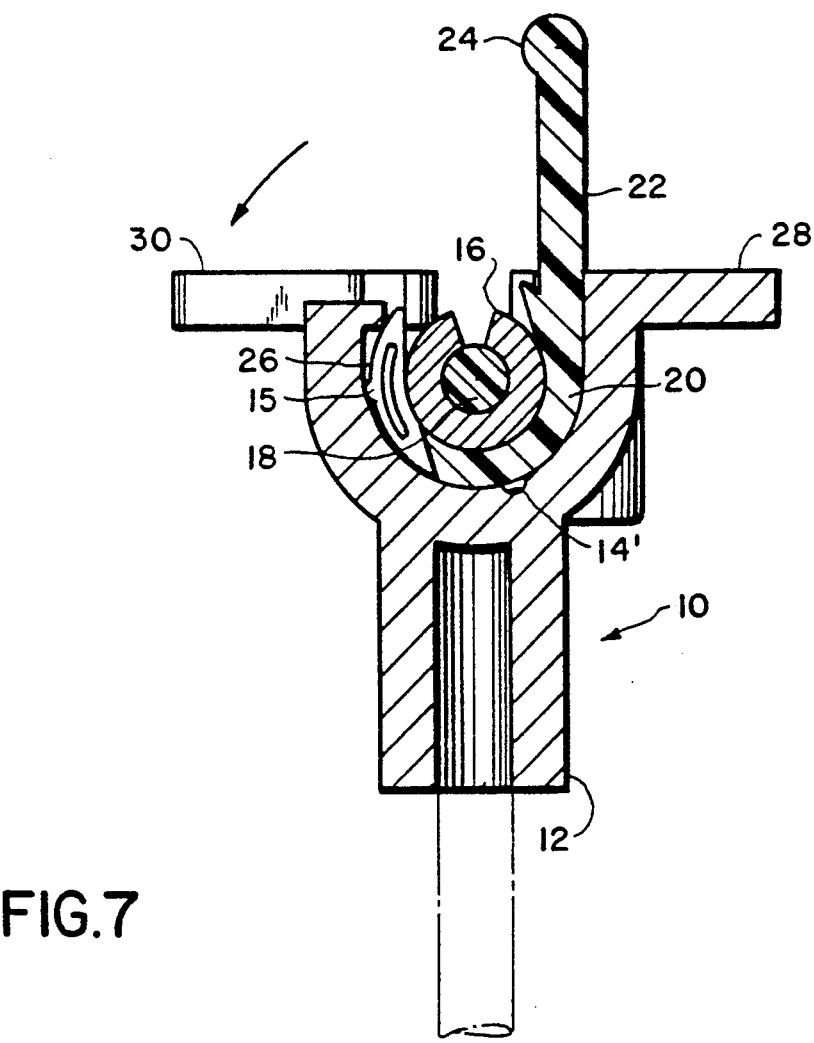
FIG. 7 is a sectional view of the hub attachment with the locking tab in its unlatched position.

FIG. 1 shows the assembly of the invention, in which the hub attachment for the shaft of a motor in a grass-/weed trimmer is referred to by the numeral 10. The hub attachment is provided with a cylindrical attachment part 12 in which a motor shaft with a straight knurl pattern frictionally fits, as shown in phantom lines in FIGS. 5, 7 and 8. The hub attachment 10 is further provided with a semi-cylindrical cavity 14 in which is adapted to be inserted, a soft metal anchor lug 16 that is crimped centrally around the cutting line 18. An intermediate member for retaining the anchor lug 16 is utilized in the form of retainer line anchor 20, which is adapted to being inserted within the semi-cylindrical cavity 14 of the hub attachment before the metal anchor lug 16 and cutting line 18 is inserted therein. As seen in FIGS. 13-16, the soft metal anchor lug 16 initially is in a planar form with serrations 17 extending perpendicular to the longitudinal axis of the cutting line 18 when installed, as seen in FIGS. 15 and 16. It is also within the scope of the present invention to fabricate an anchor lug molded as an integral part with a cutting line, as well as a cutting line inserted through a closed cylindrical tube and then staked in order to retain the cutting line therein at a preselected location.

The cutting line 18 is preferably a nylon, mono-filament line of the type used in lawn and garden equipment commonly known as string trimmers. In the past it has been difficult to replace the nylon cutting line when it became partially severed so that it did not function properly. In that case, the hub assembly, which had a number of parts, would ordinarily be taken apart and the new nylon string length would be wound around the spool and re-inserted in the assembly. The present invention overcomes that difficulty of replacing the cutting line by providing pre-cut cutting lines together with a central anchor lug of any suitable material such as metal or plastic for centrally positioning the cutting line within the hub so that substantially identical lengths of cutting line portions extend out of opposite sides of the anchor lug, and thus dynamically balancing the same automatically. Means are provided for securely latching the cutting line within the hub assembly, which will be described in detail hereinafter.

Figure 2:
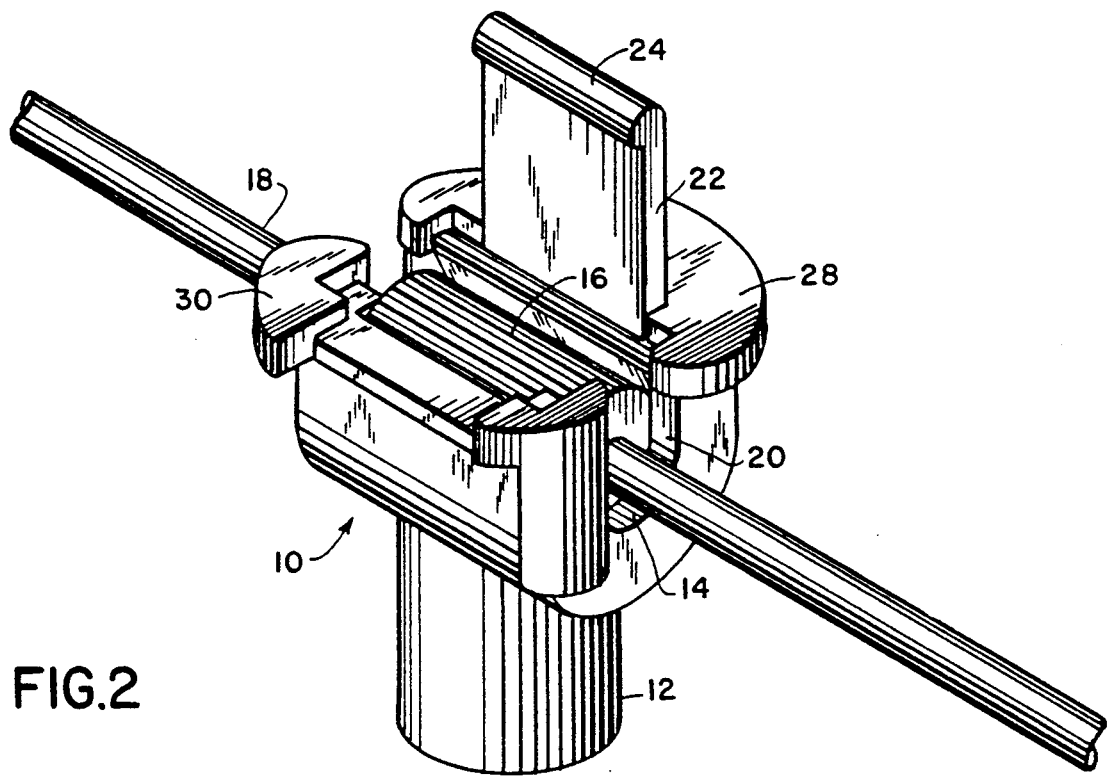
FIG. 2 is a perspective view of the hub attachment and retainer-line anchor therein with a tab, shown in its unlatched position.
Figure 3:
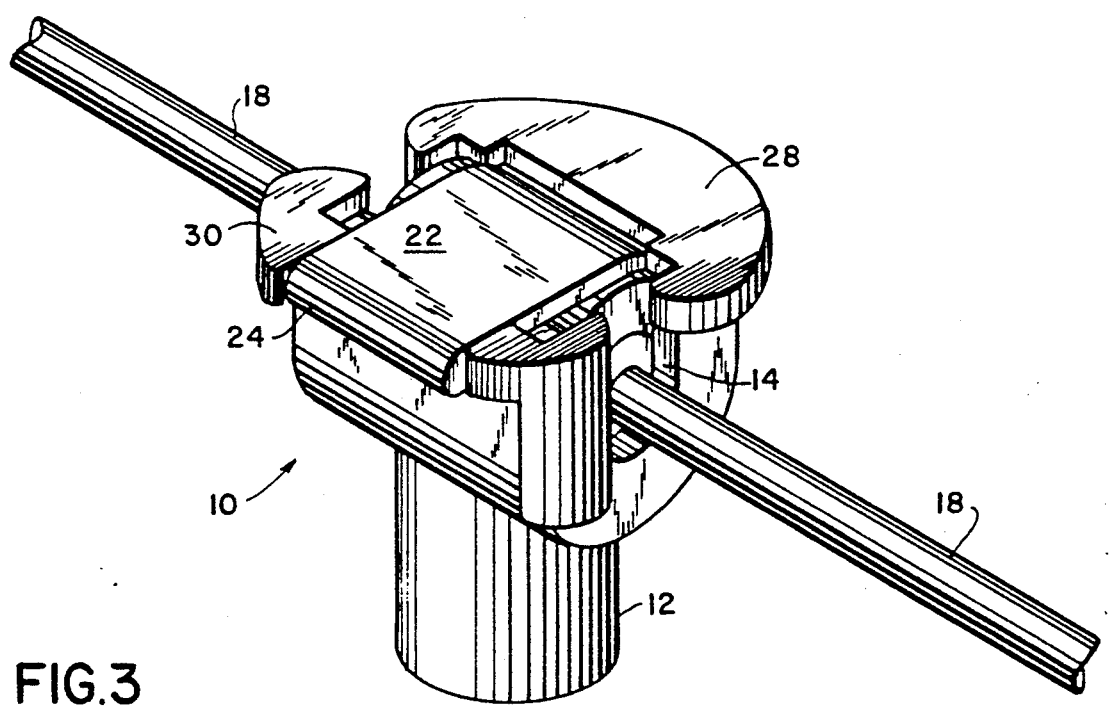
FIG. 3 is a perspective view of the hub attachment with the retainer line anchor and cutting line with the tab in its latched position.
Figure 4:
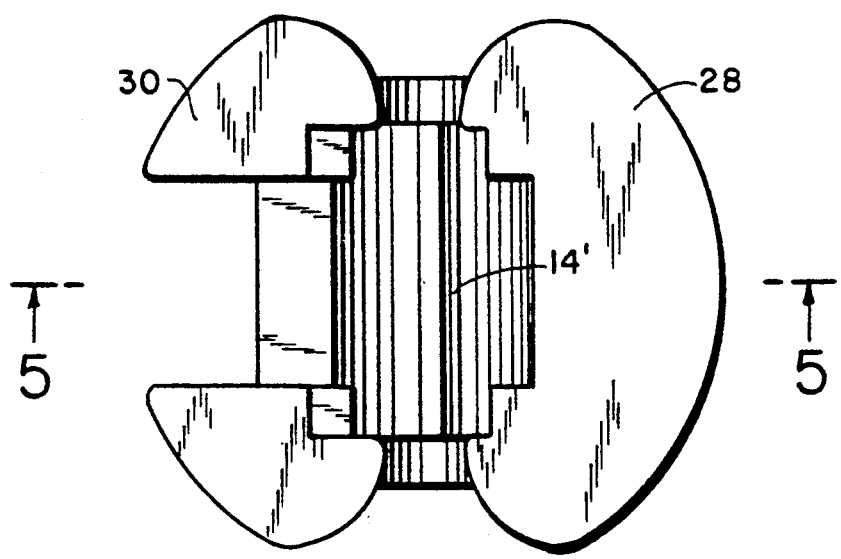
FIG. 4 is a top plan view of the hub thereof.
Figure 6:
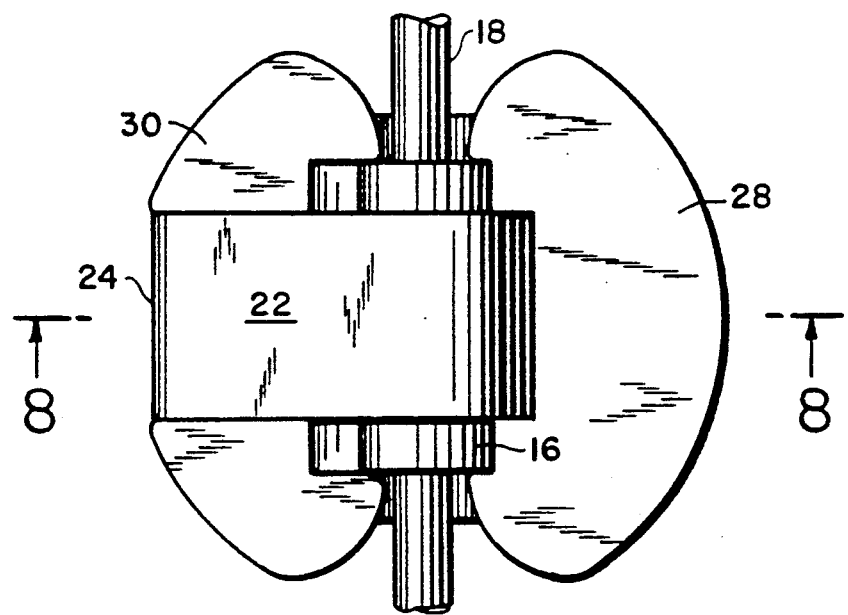
FIG. 6 is another top plan view of the assembly constituting the present invention showing the tab in its latched position, as it secures the line anchor/cutting line assembly.
Figure 8:
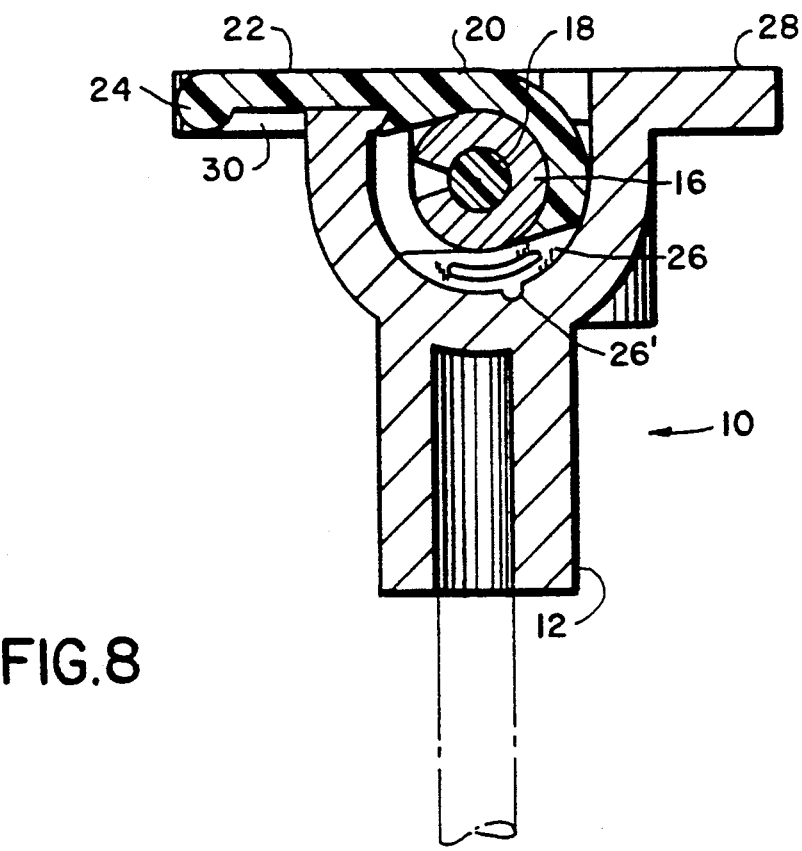
FIG. 8 is a sectional view taken along the lines 8—8 of FIG. 6 showing the tab in its latched position.

Referring to FIGS. 1, 2 and 3, the retainer line anchor 10 is provided with a pivotal tab or release arm 22. When the metal anchor lug 16 together with the cutting line 18 is inserted within the retainer line anchor 20, and the latter placed in the cavity 14 of the hub attachment 10, as seen in FIG. 2, the tab 22 is shown in it's open position. The tab is then rotated 90 degrees as illustrated in FIGS. 3, 6 and 8 to securely lock the assembly together.

Figure 5:
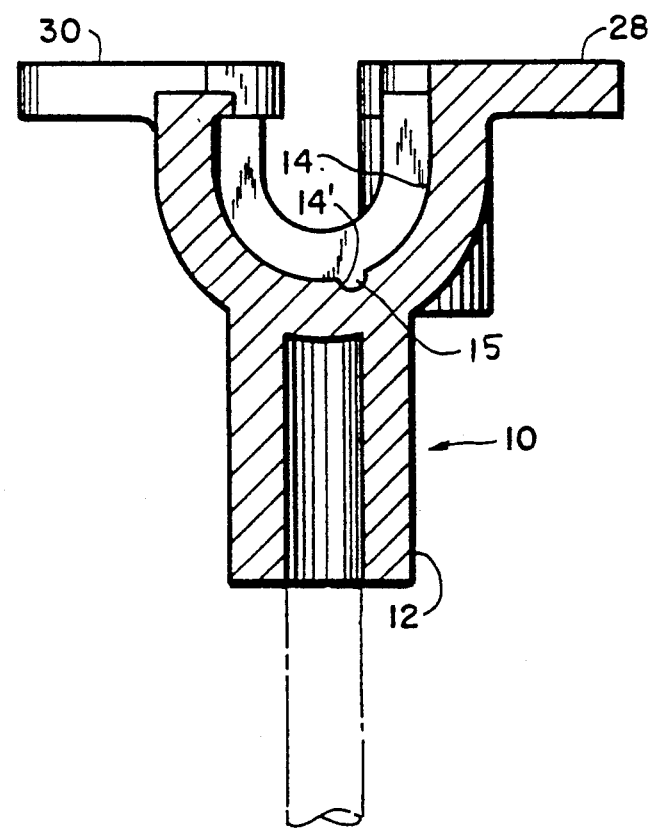
FIG. 5 is a sectional view taken along the lines 5—5 of FIG. 4.

As seen in FIG. 5 the semi-circular cavity 14 is provided with a depression 14' which accepts the correspondingly shaped bump 15 on an exterior surface of the retainer line anchor 20 in order to hold the anchor 20, lug 16 and cutting line 18 in the cavity 14.

Figure 9:
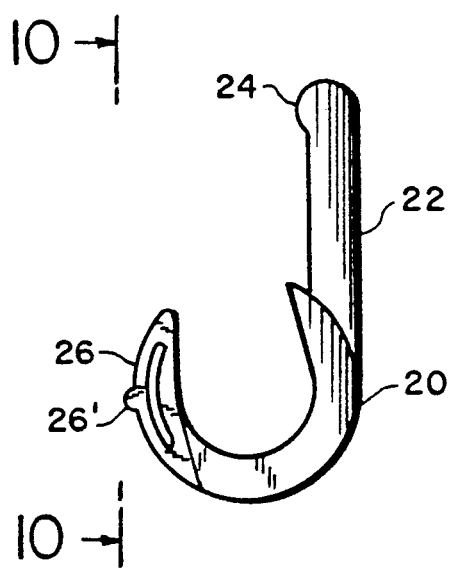
FIG. 9 is a side elevational view of the retainer line anchor as seen in FIG. 7.
Figure 10:
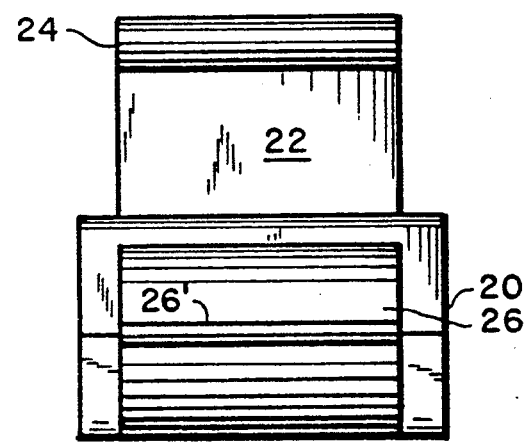
FIG. 10 is a view taken along the lines 10—10 of FIG. 9.

The retainer line anchor 20 is particularly seen in FIGS. 9 and 10 showing the locking tab or release arm 22 in its open, or unloaded condition. The tab or release arm 22 is provided with a latch element 24 at the free end thereof in the form of a knob, while the retainer line anchor at the other end thereof has a spring-lock detent 26 which assumes a locked position when the retainer line anchor 20 is snugly inserted within the cavity or nest 14 of the hub 10. As seen in the Figures, the hub 10 is provided with two oppositely positioned strain relief wings 28 and 30 that function to distribute stress on a greater proportion of the cutting line as the motor shaft rotates.

As seen in FIGS. 11 and 12, an alternate version of the retainer line anchor 20 is shown, which is provided with three relief grooves 32 as well as an elongated curvilinear cut-out 34 to create the flex arm portion of the retainer. This alternate embodiment of the retainer line anchor 20 functions to distribute the flex pressure over a larger area and thus reduces the possibility of breaking or fracturing of the locking detent portion of the embodiment shown in FIGS. 7-10.

It should be noted that the release arm of the retainer line anchor 20 is provided with the locking detent for the purpose of being sprung into a matching void in the bottom of the hub cavity or nest, and thus forming a spring-loaded mechanical interlock that will prevent the release arm from unintentionally moving out of its latched or locked position.

In order to replace the nylon cutting line, the finger of a user is placed on the knob 24 of the release arm 22 when it is in the latched condition as seen in FIG. 2, and pressure is applied in an upper direction to overcome the resistance provided by the locking detent or knob 24, thus causing the release arm 22 to become unlatched and rotate through an arc of 90 degrees, and consequently exposing the anchor lug 16 for easy removal and replacement. Thus, a new anchor lug 16 having cutting lines 18 projecting out of opposite ends of the anchor lug is inserted within retainer line anchor 20.

Referring now to FIGS. 13-16 in which is shown the soft metal anchor lug 16 which is originally in a flat planar form, as seen in FIGS. 13 and 14, but is bent into a cylindrical or tubular configuration as seen in FIGS. 15 and 16. It should be noted that the serrations 17 are present on the inside surface of the anchor lug, and when the anchor lug is securely crimped around the nylon line 18, the serrations firmly grip the nylon line to prevent slippage when the nylon line is rotated for cutting grass and vegetation. It should be noted that the serrations 17 are disposed in a plane perpendicular to the longitudinal axis of the cutting line 18.

The present string retaining hub assembly constitutes an arrangement which securely retains a cutting line, and also centers it in the cutting chamber for optimum dynamic balance and performance. Furthermore, the present arrangement provides for rapid replacement of the cutting line, when required, without the need for tools.

While the present invention has been disclosed with reference to two embodiments thereof, it will be apparent that many variations and modifications may be made therein, and it is therefore intended to cover each such variation and modification which falls within the true spirit and scope of the invention in the following claims:

I claim:

1. A hub attachment for a rotatable drive shaft of an electric grass/weed trimmer comprising a hub having a cavity, a rotatable cutting line, an anchor lug secured to and substantially surrounding an exterior surface of said cutting line, a retainer line anchor surrounding said lug and being provided with a pivotal tab having a latching free end, said retainer line anchor and said anchor lug having said cutting line inserted in the cavity of said hub whereby said tab can be rotated from an open position to a closed position in which the latching free end of said tab frictionally engages a part of said hub attachment.

2. A hub attachment as claimed in claim 1 wherein said lug is centrally located on said cutting line.

3. A hub attachment as claimed in claim 1 wherein hub cavity is semi-cylindrical and the retainer line anchor is substantially cylindrical for nesting in said cavity.

4. A hub attachment as claimed in claim 1 further comprising a pair of strain relief wings on opposite sides of said hub attachment for distributing stress resulting from the rotation of the cutting line when said drive shaft rotates.

5. A hub attachment as claimed in claim 2 wherein said tab is rotated substantially 90 degrees thereby trapping said line anchor and anchor lug in the cavity of the hub preventing dislodgement thereof.

6. A hub attachment for a rotatable drive shaft of an electric grass/weed cutter comprising a hub having a cavity, a rotatable cutting member, an anchor lug substantially surrounding and secure to an exterior surface of said cutting member, a retainer line anchor holding said anchor lug and being provided with a pivotable latching free end, said anchor lug and retainer line anchor being inserted in the cavity of said hub whereby said tab can be rotated from an open position to a closed position in which the latching free end of said tab frictionally engages a part of said hub attachment to thereby surround and entrap said anchor lug.

7. A hub attachment as claimed in claim 6 wherein said cutting member extends laterally from opposite sides of said anchor lug.

8. A hub attachment as claimed in claim 1 wherein said anchor lug and cutting line are an integral unit.

9. A hub attachment for a rotatable drive shaft of an electric grass/weed trimmer comprising a hub having a semi-circular cavity, a rotatable cutting line, a cylindrical anchor lug secured to and substantially surrounding an exterior surface of said cutting line and positioned centrally thereon, a retainer line anchor surrounding said lug having a semi-circular interior surface and being provided with a pivotable tab having a latching free end, said anchor lug being inserted in the retainer line anchor to form an assembly, and said assembly being inserted in the cavity of said hub whereby said tab can be rotated from an open position to a closed position in which the latching free end of said tab frictionally engages a part of said hub attachment to securely hold the assembly therein.

10. A rotatable cutting line cartridge assembly for insertion in a cartridge holding cavity of a hub of a rotatable drive shaft comprising a retainer member for holding an anchor lug and an anchor lug positioned centrally on a cutting line having substantially identical lengths of cutting line portions extending out of opposite sides of said anchor lug, said anchor lug being secured to an outer surface of said cutting line, and said carriage assembly being releasably lockable within said cavity to secure said anchor lug and line by movement of a pivotable locking tab on said retainer.

11. A cartridge assembly as claimed in claim 10 wherein said anchor lug comprises a bendable planar sheet with serrations on the surface engaging said cutting line, said planar sheet being folded around said cutting line and secured thereto.

12. The assembly of claim 11 wherein said anchor lug in its folded-over position has a cylindrical shape for being received in a cylindrical portion of said retainer.

13. The assembly of claim 11 wherein said bendable sheet is fabricated of soft metal.

14. The assembly as claimed in claim 10 further comprising the cartridge assembly having a projection on the outer surface thereof for being received in said cavity, said cavity having a depression matching said projection, the projection cooperating when said cartridge assembly is inserted in said cavity by said projection on said cartridge assembly mating with said depression in response to pivotal movement of said pivotable locking tab thereby firmly holding said cartridge assembly in said cavity.

15. A replaceable cutting line assembly for a weed trimmer of the type having a rotatable drive shaft and hub for removably holding a cutting line assembly for rotation in a cutting plane, said replaceable cutting line assembly comprising a section of cutting line and an anchor lug securely holding said section of cutting line with opposite cutting end portions projecting from opposite ends of the anchor lug, wherein the cutting line assembly may rotate in a cutting plane when said anchor lug is centered for rotation in the rotatable hub of a trimmer.

16. The replaceable cutting line assembly of claim 15 wherein said anchor lug is formed around the middle portion of said section of cutting line and crimped to securely hold said line.

17. The replaceable cutting line assembly of claim 16 wherein said anchor lug is formed around the mid section of said section of cutting line from a bendable planar sheet to substantially surround the exterior surface of said line.

18. The replaceable cutting line assembly of claim 15 wherein said anchor lug is fabricated with a central longitudinal opening for receiving the middle portion of said cutting line by passing one end of the line therethrough and said anchor lug is crimped to securely hold the line in position.

19. The replaceable cutting line assembly of claim 18 wherein said anchor lug is a short cylindrical shape.

20. The replaceable cutting line assembly of claim 19 wherein said anchor lug is formed from extruded metal.

21. A replaceable cutting line cartridge assembly for insertion into a cartridge holding cavity of a rotatable hub for rotation in a cutting plane, said cartridge assembly comprising an anchor lug fabricated with a line receiving longitudinal opening for surrounding a section of cutting line passing through said opening, and a section of cutting line being securely held in a centered and balanced position therein.

22. The replaceable assembly of claim 21 wherein said line is securely held by crimping said anchor lug after centering said cutting line therein.

23. The replaceable assembly of claim 22 wherein said anchor lug has a cylindrical shape and said longitudinal opening is coaxial with respect to the longitudinal axis of said cylindrical anchor lug.

24. The replaceable cutting line assembly of claim 23 wherein the anchor lug is formed from extruded metal.

25. A replaceable cutting line assembly for a weed trimmer of the type having a rotatable drive shaft and rotatable hub for removably holding a replaceable cutting line assembly for rotation in a cutting plane, said replaceable cutting line assembly comprising a pre-cut section of cutting line having oppositely extending cutting end portions and an anchor lug securely holding said section of cutting line with said oppositely extending cutting end portions projecting from opposite ends of the anchor lug, the section of pre-cut cutting line being a length selected to exceed the diameter of a rotatable hub of a trimmer, wherein the oppositely extending end portions of the replaceable cutting line assembly may rotate in a cutting plane when said anchor lug is centered for rotation in a rotatable hub of a trimmer.

* * * * *

UNITED STATES PATENT AND TRADEMARK OFFICE
CERTIFICATE OF CORRECTION

PATENT NO.    :    5,170,561
DATED         :    December 15, 1992
INVENTOR(S)   :    Sepke It is certified that error appears in the above-identified patent and that said Letters Patent is hereby corrected as shown below:

In column 3, after line 19, add the following paragraph:

--As seen in Figure 2, the anchor lug 16 holding substantially identical oppositely extending lengths of cutting line and the retainer member 20 form a cartridge assembly for insertion in a cartridge cavity of the rotatable hub when the cylindrical portion of the anchor lug is loaded into the retainer member for insertion into the hub.--

In column 4, line 28, delete "pivotal" and add --pivotable--.

In column 4, line 53, delete "secure" and add --secured--.

In column 5, line 22, delete "carriage" and add --cartridge--.

In column 6, line 19, delete "said" and add --the--.

UNITED STATES PATENT AND TRADEMARK OFFICE
CERTIFICATE OF CORRECTION

PATENT NO. : 5,170,561
DATED : December 15, 1992
INVENTOR(S) : Sepke

It is certified that error appears in the above-indentified patent and that said Letters Patent is hereby corrected as shown below:

In column 6, line 21, delete "said" and add --the--.

Signed and Sealed this

Nineteenth Day of October, 1993

Attest:

BRUCE LEHMAN

*Attesting Officer*  *Commissioner of Patents and Trademarks*